United States Patent [19]

Matsumura

[11] 4,139,808

[45] Feb. 13, 1979

[54] CONTROL APPARATUS FOR ELECTRICALLY DRIVEN SEWING MACHINE

[75] Inventor: Nobuyoshi Matsumura, Yao, Japan

[73] Assignee: Maruzen Sewing Machine Co., Ltd., Moriguchi, Japan

[21] Appl. No.: 831,869

[22] Filed: Sep. 9, 1977

[51] Int. Cl.[2] .......... H02P 3/10

[52] U.S. Cl. .......... 318/269; 318/302; 318/345 G; 318/374; 318/466

[58] Field of Search .......... 318/369, 374, 373, 466, 318/302, 269, 331, 345 G

[56] References Cited

U.S. PATENT DOCUMENTS

| | | | |
|---|---|---|---|
| 3,564,376 | 2/1971 | Mais et al. | 318/466 |
| 3,735,224 | 5/1973 | Bachofer et al. | 318/374 |
| 3,832,613 | 8/1974 | Bernstein et al. | 318/466 |
| 3,906,315 | 9/1975 | Gotisar | 318/369 |

*Primary Examiner*—Gene Z. Rubinson

*Attorney, Agent, or Firm*—Arnstein, Gluck, Weitzenfeld & Minow

[57] ABSTRACT

A sewing machine driven by a motor which is adapted to be energized by an alternate current power supply and is phase controlled by means of thyristors. In a normal operating mode the conduction phase of the thyristors is made variable as a function of the extent of the depression of a foot controlled pedal, whereas in a low constant speed mode the thyristors are made conductive at a predetermined phase. The motor is coupled to a main shaft which is provided with a magnet located at a predetermined position, while a bracket arm is provided with a reed switch located at a predetermined position, such that if and when the foot controlled pedal is released, the reed switch is actuated to trigger the thyristors for reverse braking of the motor as a function of the counter electromotive force of the motor. Preferably, a timer is provided for interrupting the power supply after the lapse of a predetermined time period after the foot controlled pedal is released.

7 Claims, 3 Drawing Figures

PD
PL
O
X
Y
SW102
RS
R1
R1a1
TIMER
TM
D101
SCR
r101
r102
N
O
r103
C
r105
C101
D102
SW101
R1b1
R1a3
r104
+
M
R1a2
−
R1a4
R1b2

RS
MG
SP
B2
B1
MP
M
SH
AM
BS
CR
NR
NDL

R1
RS
R1a1
TIMER
TM
X
Y
O
SW102
PD
SCR
r105
C101
R1b1
R1a3
R1a4
M
R1b2
D102
O
SW101
N
C
R1a2
r101
r103
r102
r104
D101
PL

CONTROL APPARATUS FOR ELECTRICALLY DRIVEN SEWING MACHINE

BACKGROUND OF THE INVENTION

1. Field of the Invention

The present invention relates to an automatic control apparatus for an electrically driven sewing machine. More specifically, the present invention relates to a control apparatus for a sewing machine driven by a motor which functions to bring the needle to a stop at a predetermined position, such as the upper dead point or the lower dead point.

2. Description of the Prior Art

Heretofore, a sewing machine adapted to be driven by a universal motor has been put in practical use. In such an electrically driven sewing machine, it is desired for the purpose of safety and efficiency of operation that the needle be brought to a stop at a predetermined position, preferably at a position in the vicinity of the upper dead point. In order to bring the needle to a stop at a predetermined position, the needle has been mechanically and forcibly brought to a stop by the use of an electromagnetic clutch or the like when the needle reached a predetermined position, as practiced, in industrial sewing machines. However, in such sewing machines wherein the needle is mechanically brought to a stop, a mechanically movable part is likely to be worn out early while the machine may be used for a longer period of time. This degrades the accuracy of stopping the needle at a predetermined position. In addition, such a mechanical needle stopping apparatus requires a very large space and a complicated structure. For these reasons, such a mechanical needle stopping apparatus may not be employed in small sized and inexpensive sewing machines intended for domestic use.

SUMMARY OF THE INVENTION

Briefly described, the present invention relates to a control apparatus for an electrically driven sewing machine, which comprises a main shaft driven by a motor, a needle coupled to the main shaft, means for detecting the needle in a predetermined position, means for controlling the speed of the motor, and means for reverse braking said motor, the last mentioned means being responsive to the output of the detecting means, if and when the speed control means is not operated.

A principal object of the present invention is to provide in an electrically driven sewing machine a control apparatus for stopping a needle at a predetermined position which is inexpensive, small in size and reliable in operation.

Another object of the present invention is to provide a control apparatus for an electrically driven sewing machine, which is adapted to bring the motor to a stop after the lapse of a predetermined time period, even if the motor is stopped at the position where a needle detecting mechanism is inoperable.

A further object of the present invention is to provide in an electrically driven sewing machine a control apparatus which is effective for stopping the needle at a predetermined position by reverse braking of the motor, so that uneven rotation does not occur after the needle is brought to a stop at the predetermined position.

These and other objects, features, aspects and advantages of the present invention will become more apparent from the following detailed description when considered in conjunction with the accompanying drawings.

DESCRIPTION OF THE PREFERRED EMBODIMENTS

Figure 1:
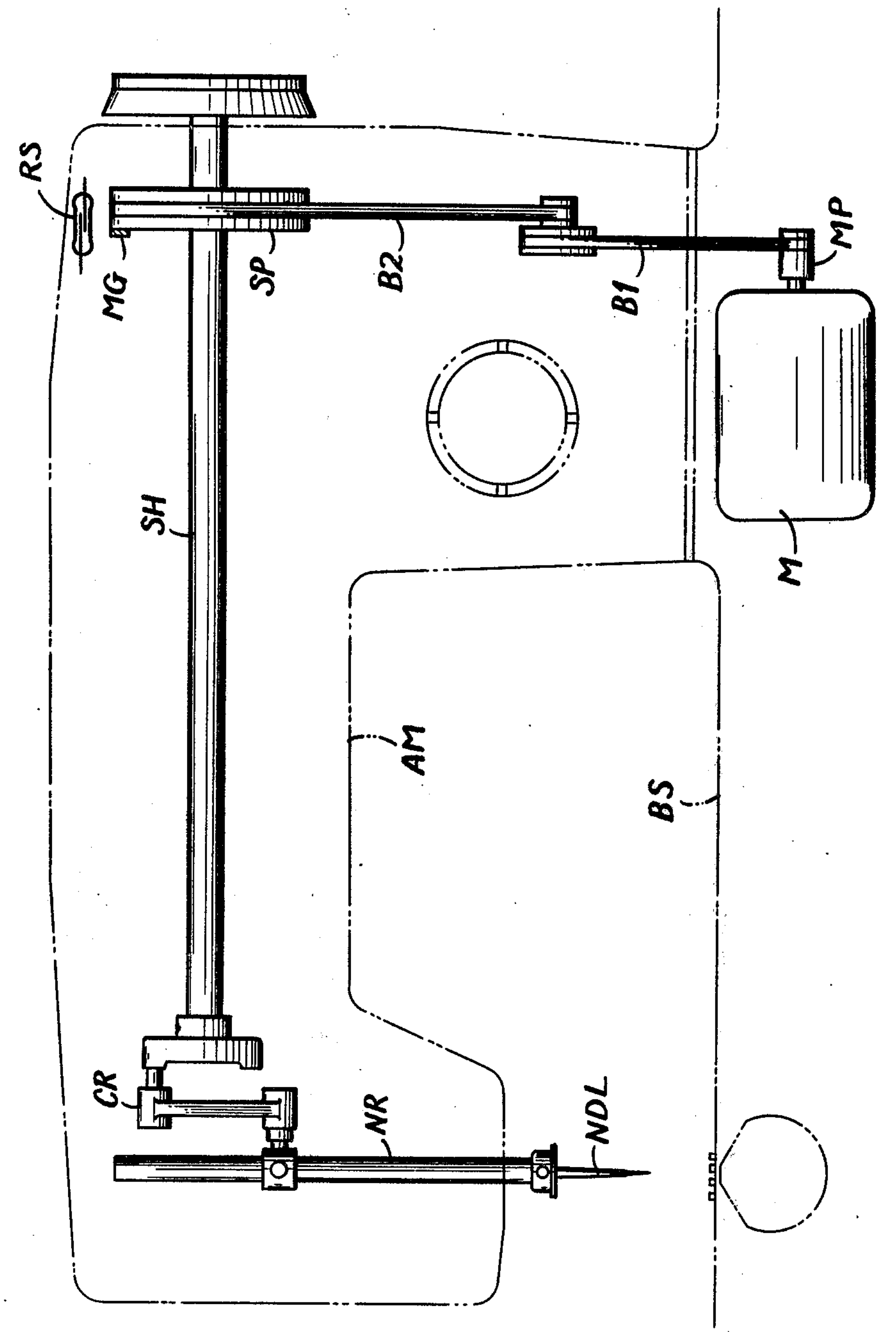
FIG. 1 is a simplified elevational view showing a major portion of an electrically driven sewing machine in which the present invention may be advantageously employed.

Referring to FIG. 1, supported on a machine bed BS is an arm AM in which various mechanisms are housed and supported beneath the machine bed is a direct current motor M. A belt B1 is engaged with a pulley MP mounted on the shaft of the motor M. The belt serves to transfer the driving force to a belt B2 through an intermediate pulley P. The belt B2 also is engaged with a pulley SP mounted on a main shaft SH which provides a prime mover for various mechanisms in the machine. The main shaft SH is coupled to a needle bar NR through a crank CR, whereby the needle bar NR is vertically reciprocated as the main shaft SH is rotated. A needle NDL is carried in the lower end of the needle bar NR. A conventional loop taker and bobbin are disposed in registration with the needle.

Although not shown, the machine is provided with a pedal operated rheostat in circuit with the driving motor M, the rheostat being adjustable in accordance with depression of the pedal thereby to control the speed of the motor M. The embodiment shown is further structured such that the needle NDL is caused to be stopped in the vicinity of the upper dead point. For the purpose of detecting the position of the needle NDL at the upper dead point, a magnet MG is fixed in a predetermined position on the pulley SP of the main shaft SH. A reed switch RS is mounted in the arm AM in a position to be in close proximity to the magnet MG when the needle NDL reaches the position corresponding to the upper dead point during the movement of the magnet MG as the pulley SP is rotated. Accordingly, such dead point of the needle NDL is detected by means of the magnet MG provided on the pulley SP and the reed switch RS.

It is pointed out that FIG. 1 shows only that portion of the sewing machine related to the present invention with the other mechanisms being omitted for simplicity of illustration and description.

Figure 2:
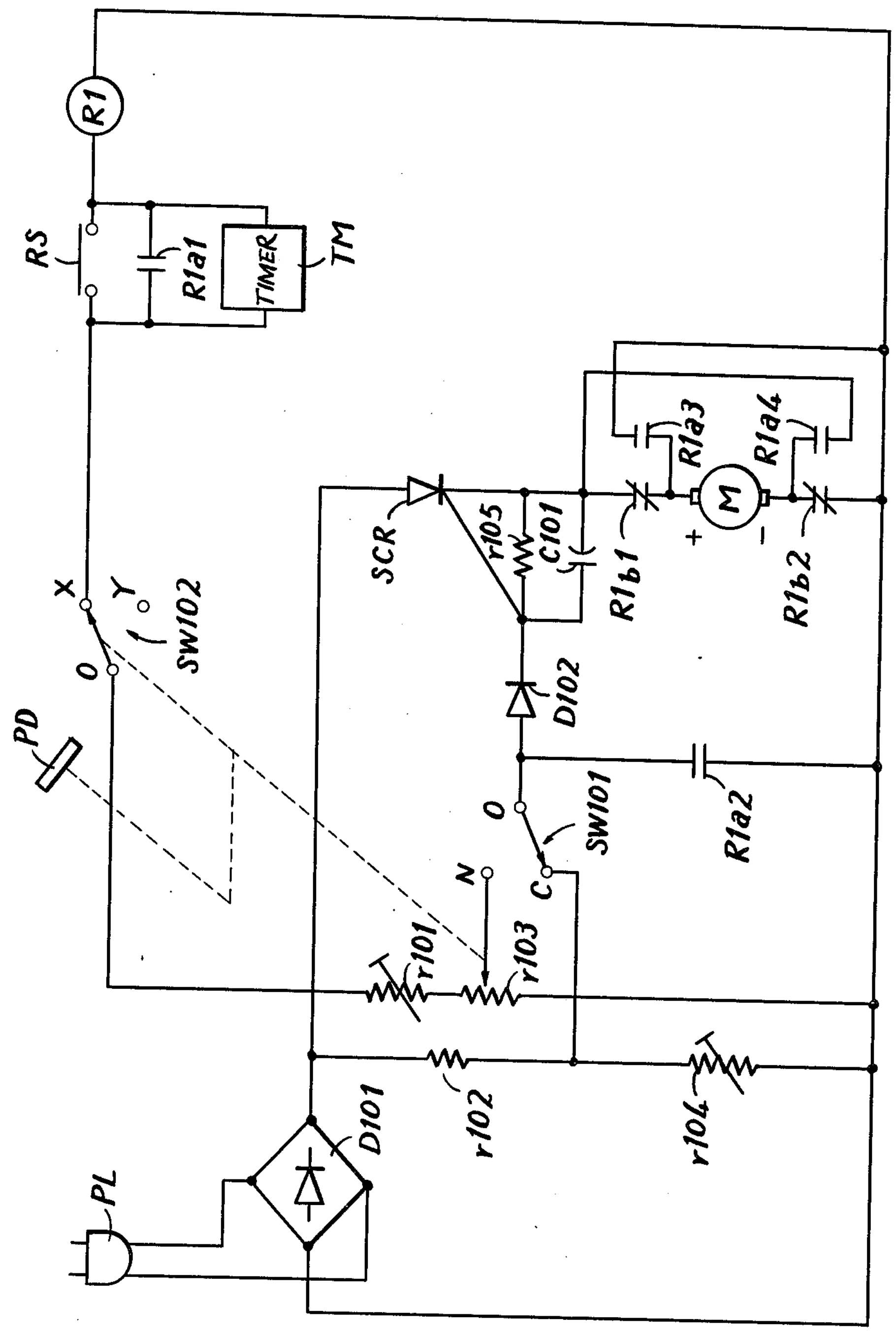
FIG. 2 is a schematic diagram showing one embodiment of the present invention.

FIG. 2 shows a schematic diagram of a preferred embodiment of the present invention which will be described in greater detail with simultaneous reference to FIG. 1.

The present invention first will be considered without the use of a timer TM.

NORMAL OPERATION MODE

In order to achieve this operation mode, a mode change switch SW101 is manually turned to the contact N and plug PL is connected to a commercial power source. Thereafter, when foot controlled pedal PD of a rheostat controller is gradually depressed a switch SW102 mechanically connected with the pedal PD is rocked to the contact Y. A setting voltage V1 obtained by a potentiometer implemented by a high speed setting semifixed resistor r101 and a variable r103 also connected to the pedal is adjusted in accordance with the depression of the pedal PD. This voltage is applied to the gate electrode of a thyristor SCR through the switch SW101 and a diode D102. Accordingly, a gate current is applied to the gate of the thyristor SCR, whereby the thyristor SCR is energized. The motor M now begins to rotate and the rotational speed is controlled in accordance with the depression of the controller pedal PD and the value of the variable resistor r103. Thus, normal operation at a relatively high speed for a normal sewing operation is achieved.

When for the purpose of completion or interruption of the sewing operation the controller pedal PD is released, the switch SW102 is caused to be rocked to the contact X and a circuit is closed to which the reed switch RS is responsive. Now considering a case where the needle NDL has not reached the upper dead point of a predetermined position, in such a situation, the reed switch RS is not closed and a relay R1 is not energized. The motor M continues to rotate by virtue of its inertia and the needle NDL makes one additional reciprocating movement and reaches the upper dead point position after one additional stitch.

If and when the needle NDL reaches the upper dead point as described above, the magnet MG of the pulley SP comes to confront the reed switch RS so that the reed switch RS is closed. Electrical current from the plug PL and thus from the full wave rectifying circuit D101 is applied to the relay R1 through the switch SW102 and the closed reed switch RS and the relay R1 is energized. Energization of the relay R1 causes normally open contacts R1*a*1 through R1*a*4 to be closed and normally closed contacts R1*b*1 and R1*b*2 to be opened. Accordingly, the relay R1 is self-retained by means of the normally open contact R1*a*1. Since the normally open contact R1*a*2 is closed, the thyristor SCR is deenergized.

Since the normally closed contacts R1*b*1 and R1*b*2 are opened and simultaneously the normal open contacts R1*a*3 and R1*a*4 are closed, the polarity of the counter electromotive force V2 generated when the motor M is rotating by virtue of inertia is reversed after deenergization of the thyristor SCR. Accordingly, the gate electrode of the thyristor SCR is supplied with a positive gate signal which again energizes the thyristor SCR to effect energization of the motor M. However, since the polarity of the current flow through the motor M has been reversed by means of the relay contacts R1*a*3 and R1*a*4 and R1*b*1 and R1*b*2, the motor M is energized for rotation in a direction opposite to the direction of the rotation resulting from inertia, so that the rotational speed is abruptly decreased. Accordingly, the counter electromotive force V2 of the motor M also is abruptly diminished and the thyristor SCR is deenergized with the result that the motor M and thus, the needle NDL is brought to a stop at the upper dead point position.

CONSTANT OPERATION MODE

In order to achieve this mode, the mode change switch SW101 is turned to contact C and the plug PL is connected to a commercial electrical power source. The gate electrode of the thyristor SCR is supplied with the set voltage V1 which is a relatively low voltage divided by means of the resistors r102 and r104. Accordingly, the conduction phase of the thyristor SCR is small and the motor M is caused to be rotated at a predetermined constant low speed suitable for tacking, darning, and the like.

In order to complete or interrupt a sewing operation, the controller pedal is released. If and when the needle NDL reaches the upper dead point, the magnet MG of the pulley SP is in close proximity to the reed switch RS and effects closing of the reed switch RS. Accordingly, as in case of the above described normal operation mode, the motor M is reverse braked, so that the needle NDL is brought to a stop at the upper dead point position.

As described hereinabove, the main circuit of motor M is interrupted at the point where the needle NDL having reached the upper dead point or prescribed position is detected, while the motor is reverse braked as a function of the counter electromotive force generated by its rotational inertia. Accordingly, the motor M and thus the needle NDL are brought to a stop with certainty. No other particular considerations are necessary to be given to the inertia of the motor and the machine in stopping the needle at a predetermined position. In addition such a stopping operation may be effected at high speed, although conventionally it was effected at a very slow speed because of inertia. Because the needle is brought to a stop at an upper dead point position, the efficiency in operation and safety are improved, a feature which is particularly advantageous to an inexperienced user of the machine.

According to the embodiment shown, even if the needle were brought to a stop at the upper dead point, and the flywheel were manually rotated to disable the needle position detecting circuit, including the reed switch RS and the magnet MG, the motor would not suddenly begin to rotate, thus insuring the safety of the operator.

Now considering a case where the motor M is subjected to an overload because of entanglement of the thread with the loop taker or any other part of the mechanism, whereby the motor M is stalled. In a situation where the sewing machine is brought to a stop because of an abnormal operation, the operator is likely to release the controller pedal in an attempt to interrupt the current flowing to the motor M. However, if the pedal is released while the needle is not positioned at the upper dead point and the reed switch RS of the needle position defecting circuit is not actuated, then a constant current is caused to flow through the motor M, which may result in damage to the motor.

In order to eliminate such a problem, the embodiment illustrated in FIG. 2 further includes a timer TM connected in parallel with the reed switch RS which serves as the above described needle position detecting means. The timer TM may typically comprise a RC type time constant circuit, an electrically driven timer, a mechanically driven timer or the like, which is adapted to be conductive after the lapse of a predetermined time period. The time period is selected to be slightly longer than the one cycle period (one second) of the minimum rotational speed (60 rpm) of an electrically driven sewing machine, and by way of example, preferably, 1.5 to 2 seconds.

When the sewing needle NDL and motor M are brought to a stop for any of the above reasons, the operator manually releases the controller pedal. If the needle NDL has been brought to a stop at the position other than the prescribed upper dead point position, then the reed switch RS is not actuated, and the motor M continues to be energized, resulting in an overflow of current. However, when the controller pedal is released, as described above, the arm of switch SW102 is caused to be rocked to engage contact X, then the timer TM is energized to initiate a timing cycle, and after an elapse of the above described time period (1.5 to 2 seconds), the timer TM becomes conductive, thereby energizing relay R1. Energization of the relay R1 causes the contact R1*a*2 to be closed, which prevents a setting voltage from being applied to the gate of the thyristor SCR. Energization of the relay R1 also causes the relay contacts R1*b*1 and R1*b*2 to be opened and the relay contacts R1*a*3 and R1*a*4 to be closed, so that the motor M is switched to the opposite polarity. The relay R1 is self-retained by closing of the contact R1*a*1. Thus, the thyristor SCR remains off and the motor M is not energized. Accordingly, the motor M is brought to a complete stop after an elapse of 1.5 to 2 seconds following release of the control pedal thereby preventing injury to the motor due to the overload. In addition, any danger to the operator, resulting from any inadvertent sudden rotation of the motor, which could occur if the current had been kept supplied, is prevented. Thus, provision of the timer TM across the reed switch RS assures an extremely safe operation when the needle NDL is brought to a stop at a position other than the prescribed position.

In general winding of the thread on the bobbin is carried out by disconnecting or declutching the motor M from the pulley SP and thus from the main shaft SH (FIG. 1), so as to rotate only the motor pulley MP. More specifically, although not shown, the periphery of the motor pulley MP is arranged to contact a rubber ring mounted on a separate rotary shaft used only for winding a bobbin. The bobbin is driven by the shaft and the motor M is rotated at a relatively low speed, as in normal operation mode, so as to wind the thread on the bobbin. When a predetermined quantity of thread is wound, the controller pedal is released. However, in such a situation the pulley SP carrying the magnet MG has not been rotated and the magnet has not moved into close proximity to the reed switch RS. Accordingly, the reed switch RS is not actuated at all and hence the relay R1 is not energized. After an elapse of the predetermined time period, the timer TM serves to interrupt the flow of current to the motor M, as in case of the above described overload. Accordingly, the motor M is brought to a stop by means of the timer TM after the winding of the thread on the bobbin has been completed.

Figure 3:
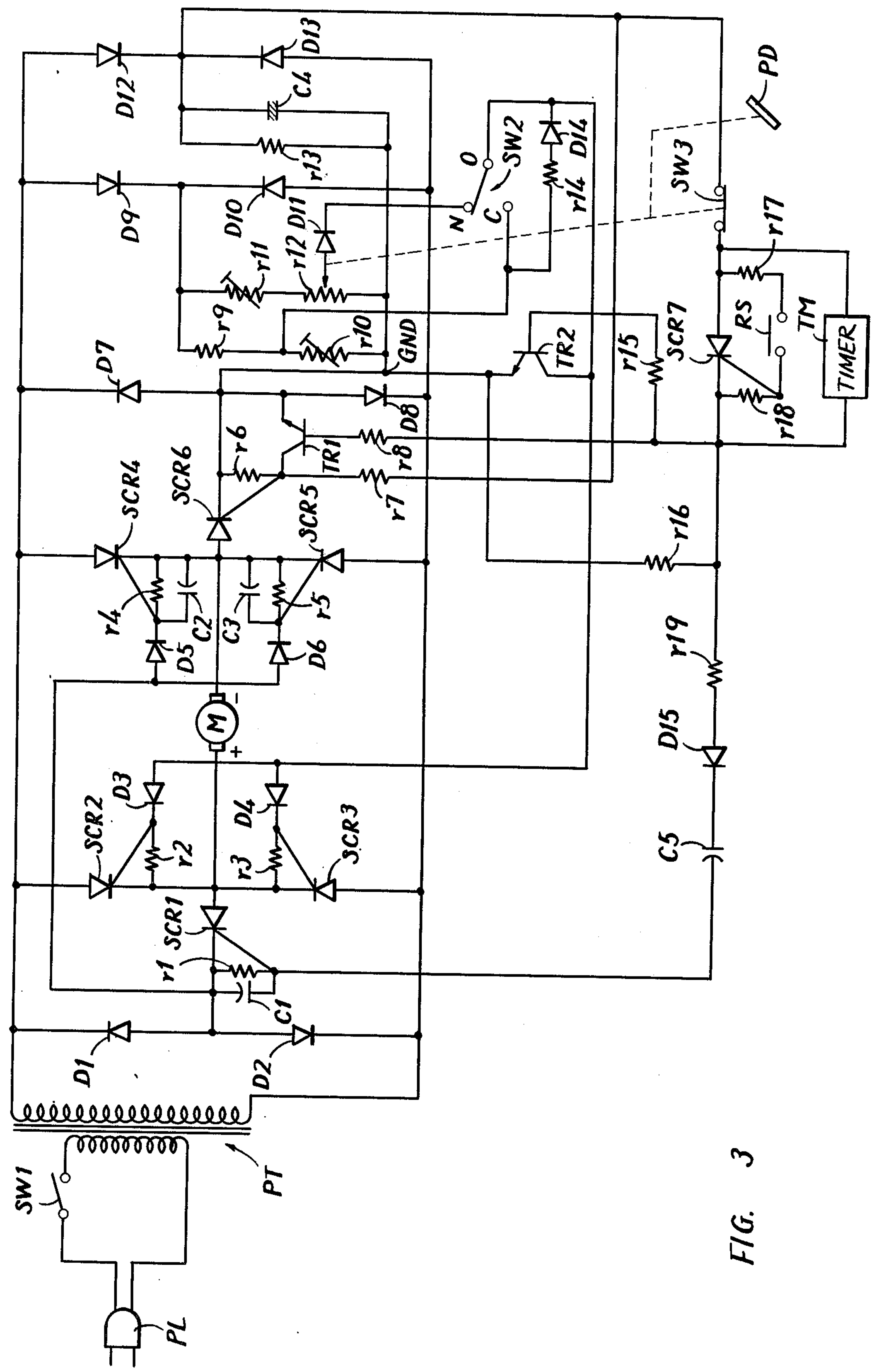
FIG. 3 is a schematic diagram showing another embodiment of the present invention.

FIG. 3 shows a schematic diagram of another preferred embodiment of the present invention. When the plug PL is connected to an electrical power source, power is supplied through a switch SW1 to the primary winding of a power transformer PT. Both ends of the secondary winding of the power transformer PT are connected in parallel to a first pair of series connected diodes D7 and D8 and a second pair of series connected diodes D12 and D13 for full wave rectification. The series connected diodes D7 and D8 are also utilized to control a direct current motor M in cooperation with a pair of series connected diodes D1 and D2 connected to the secondary winding of the power transformer PT. Both ends of the secondary winding of the power transformer PT are also connected to a pair of series connected diodes D9 and D10 for speed control of the motor M.

Both ends of the second winding of the power transformer PT are further connected in parallel to a series connected pair of thyristors SCR4 and SCR5 for reverse braking by switching the polarity of the direct current motor M, and to a pair of series connected thyristors SCR2 and SCR3 for forward driving of the said motor M. The junction of the cathode of the thyristor SCR2 and the cathode of the thyristor SCR3 is connected to the positive terminal of the armature of the motor M and is also connected to the anode of a thyristor SCR1. The junction of the cathode of the thyristor SCR4 and the cathode of the thyristor SCR5 is connected to the negative terminal of the armature of the motor M and is also connected to the anode of the thyristor SCR6. The cathode of the thyristor SCR1 is connected to the junction of the diodes D1 and D2 and the cathode of the thyristor SCR6 is connected to the junction of the diodes D7 and D8. Between the respective cathodes and gates of these thyristors SCR1 through SCR6, are connected bias resistors r1 through r6, respectively, the resistors r1, r4 and r5 being shunted by protecting capacitors C1, C2 and C3, respectively, for preventing malfunction caused by a noise component. The polarity switch circuit of the motor M is implemented by these six thyristors SCR1 and SCR6.

The junction of the diodes D12 and D13 is connected to the ground GND through a parallel connection of a smoothing capacitor C4 and a resistor r13. The junction of the diodes D7 and D8 is also connected to the ground GND. The junction of the diodes D9 and D10 is connected to the ground GND through a parallel circuit comprising a series connected resistor r9 and semifixed resistor 10 and series connected semifixed resistor r11 and variable resistor r12. The function of the variable resistor r12 is to provide a gate voltage of the thyristors SCR2 and SCR3 during the normal operation mode of the sewing machine, hereinafter to be described, and the function of the semifixed reistor r11 is to fine adjust the gate voltage for the purpose of compensating for the diversified characteristics of the various components. The function of the semifixed resistor r10 is to provide a relatively low constant gate voltage to the thyristors SCR2 and SCR3 during the constant operation mode of the sewing machine, as will be presently described. The sliding contact of the variable resistor r13 which is movable in accordance with travel of the controller pedal is connected to the normal operation mode contact N of a mode change switch SW2, while the constant operation mode contact C of the switch SW2 is connected to the junction of the resistors r9 and r10 and is also connected to the contact 0 of the switch SW2 through a resistor r14 and a diode D14. The contact C also is connected to the gates of the thyristors SCR2 and SCR3 through diodes D3 and D4 for preventing a reverse flow of the current.

The junction of the diodes D12 and D13 is connected to one contact of a normally closed switch SW3 which is opened by depression of the controller pedal PD, and is also connected through a resistor r7 to the gate of the thyristor SCR6 and then to the collector electrode of the transistor TR1. The other contact of switch SW3 is connected to the anode of the thyristor SCR7 and is also connected through a resistor r17 to one contact of the reed switch RS (FIGS. 1 and 3). The other contact of reed switch RS is connected to the gate of the thyristor SCR7 and then through a bias resistor r18 to the cathode of the thyristor SCR7. The cathode of the thyristor SCR7 is connected through resistor r19, diode D15 and capacitor C5 to the gate of the thyristor SCR1 and also is connected through resistors r8 and r15 to respective base electrodes of the transistors TR1 and TR2, respectively. The transistor TR1 serves as a switching transistor for forcibly turning off the thyristor SCR6 and the emitter electrode thereof is connected to the junction of the diodes D7 and D8 and then to the ground GND. The transistor TR2 functions to forcibly turn off the thyristors SCR2 and SCR3 and the emitter electrode thereof is connected to the ground GND.

Between the anode and cathode of the thyristor SCR7, is connected a timer TM for deenergizing the motor M when the reed switch RS is not actuated and for providing a time-up signal after the lapse of a predetermined time period. The timer TM may comprise an RC charge/discharge time constant circuit, which for example, is adapted to provide a time-up signal of the positive voltage after the elapse of the predetermined time period. Such period is selected to be slightly longer than the one cycle period (one second) of a predetermined low rotational speed (60 rpm) at the constant operation mode and is set between 1.5 to 2 seconds.

The operation of the embodiment illustrated in FIG. 3 now will be described with simultaneous reference to FIG. 1.

NORMAL OPERATION MODE

In order to achieve this operational mode, the mode change switch SW2 is manually turned to engage contact N and the power switch SW1 is closed. When the controller pedal PD is gradually depressed, switch SW3 is opened. The direct current or ripple current flowing through the diodes D9 and D10 is divided by the variable resistor r12, and adjusted by the amount of travel of the pedal PD, and the resistor r11. The gate voltage related to the amount of travel of the pedal PD is derived from the sliding contact of resistor r12 and is applied through the switch SW2 and the diodes D3 and D4 to the gates of the thyristors SCR2 and SCR3 thereby turning on both thyristors SCR2 and SCR3. Correspondingly, the gate of the thyristor SCR6 has been supplied through the resistor r7 with direct current from the diodes D12 and D13 resulting in the thyristor SCR6 being turned on simultaneously so that a relatively low alternating current generated in the secondary winding of the power transformer PT flows from the thyristor SCR2 or SCR3 to the positive terminal of the motor M. Additionally, current flows through a closed loop comprising the armature of the motor M, the thyristor SCR6, and the diode D8 or D7. Accordingly, the motor M is energized to rotate in a forward direction and its rotational speed is controlled in accordance with the travel of the pedal PD and the value of the variable resistor r12, as adjusted. The machine will operate in normal operation mode, at a relatively high speed corresponding to normal sewing.

When the pedal PD is released for the purpose of completing or interrupting a sewing operation, switch SW3 is closed to close a circuit in which the reed switch RS is responsive. Now considering a situation wherein the needle NDL has not reached its upper dead point or its upper prescribed position, then reed switch RS and thyristor SCR7 are not closed. Because pedal PD has been released, the gate electrodes of the thyristor SCR2 or SCR3 have been supplied with a relatively low preset voltage, while the motor M continues to rotate by virtue of its inertia. The needle NDL then will make one additional reciprocating movement to reach the upper dead point position, after one additional stitch.

If and when the needle NDL reaches the upper dead point, as described above, the magnet MG of pulley SP confronts the reed switch RS to close the same. Accordingly, the current from the secondary winding of the power transformer PT passing through the full wave rectifying diodes D12 and D13 is applied to the gate of the thyristor SCR7 through switch SW3 and the closed reed switch RS. A direct current voltage is applied through the diodes D12 and D13, switch SW3 and thyristor SCR7, now conductive to turn on transistors TR1 and TR2. The gate of the thyristor SCR6 is grounded through transistor TR1 and the thyristor SCR6 is turned off. Simultaneously, the gates of the thyristors SCR2 and SCR3 are grounded through transistor TR2 and thyristors SCR2 and SCR3 are turned off. The above described direct current voltage is further applied to the capacitor C5 through resistor r19 and the diode D15. Thus, a differentiated pulse is obtained from the capacitor C5 responsive to the rise of the above described direct current voltage and is applied to the gate of the thyristor SCR1 resulting in the thyristor SCR1 being turned on.

By virtue of the counter electromotive force generated by the direct current motor M, the current is applied to the gates of the thyristors SCR4 and SCR5 through the thyristor SCR1 and the diodes D5 and D6. Thus, the thyristors SCR4 and SCR5 are turned on and the polarity of the direct current motor M is reversed. More specifically, a current flows through the thyristors SCR4 and SCR5 from the negative terminal to the positive terminal of the armature of motor M. Motor M is energized to rotate in a direction opposite to the direction of rotation due to inertia, so that the rotation due to inertia is abruptly decreased. Accordingly, the counter electromotive force of motor M also is abruptly reduced and the thyristors SCR4 and SCR5 are caused to be turned off, with the result that the motor M is arrested and the needle NDL is brought to a stop at the upper dead point position.

CONSTANT OPERATION MODE

In order to achieve the constant operation mode, the mode change switch SW2 is manually turned to engage contact C and power switch SW1 is closed. The direct current or ripple voltage derived from diodes D9 and D10 is divided by resistor r9 and the semifixed resistor r10 and is applied as a relatively low gate voltage to the gate of the thyristors SCR2 and SCR3 through switch SW2 and diodes D3 and D4. Because the gate voltage is relatively low at the time, the conductivity of the thyristors SCR2 and SCR3 is low, as compared with that in the normal operation mode, with the result that the motor M is rotated at a prescribed low constant speed for the purpose of tracking, darning, or the like.

When the pedal PD is released for the purpose of completing or interrupting a sewing operation, switch SW3 is closed and a circuit is completed in which the reed switch RS is responsive. Now considering a situation where the needle NDL has not reached the upper dead point position, in such a situation the reed switch RS and thyristor SCR7 are not closed. Accordingly, motor M is kept energized by the above described relatively low set voltage applied through the thyristors SCR2 and SCR3 now conductive. The needle NDL then will make one additional reciprocating movement to reach the upper dead point position, after one further stitch.

When needle NDL reaches the upper dead point position, as described above, magnet MG of pulley SP confronts reed switch RS, to close the same. Accordingly, the current derived from the full wave rectifying diodes D12 and D13 passes through switch SW3 and closed reed switch RS to turn on the transistors TR1 and TR2. Thus, as in case of the above described normal operation mode, the motor M is reverse braked and is brought to a stop when the needle NDL reaches the upper dead point position.

As described above, the reverse braking effect is achieved through the use of six thyristors, which is advantageous in that it affords a compact and rapid speed responsive means as compared with the means utilizing the relay contacts shown in FIG. 2. After the needle NDL is brought to a stop at the predetermined dead point position, even if the flywheel coupled to the pulley SP (see FIG. 1) were manually rotated, the thyristor SCR1 is kept turned off, after the motor M is brought to a complete stop, because the thyristor SCR1 utilized for reverse braking is adapted to be turned on only by a single differentiated pulse obtained by means of the capacitor C1. Accordingly, all of the thyristors SCR1 through SCR6 for supplying a current to the motor M remain off and no current flows through the armature of the motor M. Uneven rotation of motor M by reason of the counter electromotive force is not experienced in the manual handling of the needle.

In order to explain the function and effect of the timer TM, we may consider a situation where the load on the machine for some reason is excessive and the needle NDL is brought to a stop at an intermediate position before it reaches the upper dead point, even after the pedal PD is released. In such case the reed witch RS is not actuated and release of the pedal PD causes the switch SW3 to be closed. However, because the reed switch RS is not actuated, thyristors SCR2 and SCR3 are not turned off. The result is that current continues to flow through the motor M through thyristors SCR2 and SCR3 and SCR6 with the motor M stalled. After a lapse of time of 1.5 to 2 seconds, the timer TM is actuated and a time up signal is obtained from the timer TM. The transistors TR1 and TR2 are turned on and the thyristors SCR6, SCR2 and SCR3 are turned off. Accordingly, the flow of current through the motor M is interrupted thereby preventing injury to the motor. In a case where a complicated portion of an article is to be sewn in the normal operation mode, the sewing machine preferably is operated at a reduced speed by limiting the travel of the pedal PD. Using a conventional sewing machine in such a case, the inertia is relatively low and the sewing machine is immediately brought to a stop when the pedal is released, with the result that the needle NDL may not be brought to a stop at a predetermined dead point position. In contrast, with the present invention, even if the pedal is released, a relatively low set voltage is continuously applied until the reed switch RS is actuated. Therefore, the machine is maintained in operation at a lower speed until the needle reaches the dead point position, whereupon the reed switch RS is actuated and the machine is brought to a stop with certainty.

The above described embodiment achieves reverse braking by switching the polarity of the armature of the motor. However, the same may be achieved by switching the polarity of the field winding of a shunt motor.

It will be understood that the predetermined position of the needle may be at any position other than the upper dead point or the lower dead point, and that the magnet MG may be located anywhere on any suitable member operating in synchronism with the main shaft. Of course, the reed switch always must be located so as to confront the magnet wherever it may be located. It will also be understood that the reed switch and the magnet for detection of a needle position may be replaced by a proximity switch, a photoelectric switch, or the like.

Thus, it will be seen according to the present invention, there is provided a control for an electrically driven sewing machine which functions to arrest the operation of the machine so that the needle always is brought to a predetermined stop position safely and positively even if a position detecting means is not operable.

Although this invention has been described and illustrated in detail, it is to be clearly understood that the same is by way of illustration and example only and is not to be taken by way of limitation, the spirit and scope of this invention, being limited only by the terms of the appended claims.

I claim:

1. A control apparatus for an electrically driven sewing machine, comprising alternate current power source means, means for rectifying the alternate current output, a motor adapted to be energized by the output of said rectifying means, main shaft means adapted to be driven by said motor, a needle operatively coupled to said main shaft means, controlled type switching means connected in series with said motor, means for generating a control signal for controlling said switching means, said control signal generating means including means for adjusting the speed of said motor including a potentiometer, and means for manually actuating said potentiometer of said speed adjusting means, means operatively coupled to said main shaft means for detecting a predetermined position in the travel of said needle, means for enabling said needle position detecting means to respond when said manually actuating means is released, polarity reversing means including control type switching means responsive to the output of said detecting means for reversing the polarity of said motor, whereby continued rotation of said motor provides a counter electomotive force, and means for applying the counter electromotive force of said motor as a control signal to said controlled type switching means after said polarity reversing means has been actuated, whereby the polarity of said motor is reversed responsive to the output of said detecting means and said switching means is controlled responsive to the counter electromotive force of said motor, the rotation of said motor is abruptly decreased, the counter electromotive force is abruptly diminished, the controlled type switching means is deenergized, and the rotation of the motor is stopped.

2. The invention as defined in claim 1, wherein said needle position detecting means includes rotatable magnet means associated with said main shaft means, and cooperating means fixed on a portion of said machine comprising a magnet sensitive switching means adapted to be responsive to said magnet means when said needle has reached a predetermined position.

3. The invention as defined in claim 1, wherein the polarity reversing means includes relay means activated by the output of said needle position detecting means, whereby said relay means enables said switching means to reverse the normal direction of current flow in said motor and to maintain the reverse flow of current.

4. The invention as defined in claim 1, including timing means responsive to a non-operated state of the manual speed adjusting means for providing a time up signal after the lapse of a predetermined time period of slightly longer than one cycle period of the minimum rotational speed of said main shaft means driven by said motor, thereby disabling said controlled type switching means.

5. The invention as defined in claim 4, wherein the timing means is arranged in parallel with the needle position detecting means.

6. The invention as defined in claim 1, wherein the control type switching means for polarity reversal comprises first control type switching circuit means for forming a current flow path of the output of the rectifying means to the motor in a first direction, and second control type switching circuit means for forming a current flow path of the output of the rectifying means to the motor in a second direction, polarity selection control signal generating means for generating a polarity selection control signal to the first control type switching circuit means, means responsive to the output of the needle position detecting means for disabling the first polarity selection control signal generating means, and means responsive to the output of the needle position detecting means for effecting the generation of a polarity selection control signal to the second control type switching circuit means.

7. The invention as defined in claim 6, wherein the second polarity selection control signal generating means comprises means operatively coupled to the motor and responsive to the counter electromotive force of the motor for generating the second polarity selection control signal.

* * * * *

UNITED STATES PATENT OFFICE
CERTIFICATE OF CORRECTION

PATENT NO. : 4,139,808

DATED : February 13, 1979

INVENTOR(S) : NOBUYOSHI MATSUMURA

It is certified that error appears in the above-identified patent and that said Letters Patent are hereby corrected as shown below:

On the Title Page, below INID Number [22], insert the following:

[30] Foreign Application Priority Data

| | | |
|---|---|---|
| Oct. 8, 1976 | Japan | 51-121413 |
| Oct. 8, 1976 | Japan | 51-121414 |
| Oct. 8, 1976 | Japan | 51-136372 |

Signed and Sealed this

*Twenty-ninth* Day of *May 1979*

[SEAL]

*Attest:*

RUTH C. MASON
*Attesting Officer*

DONALD W. BANNER
*Commissioner of Patents and Trademarks*